United States Patent [19]
Sano et al.

[11] Patent Number: 4,780,781
[45] Date of Patent: Oct. 25, 1988

[54] THIN FILM MAGNETIC HEAD HAVING MAGNETIC FILM OF CO-NI-FE ALLOY

[75] Inventors: Masaaki Sano; Katsuya Mitsuoka; Makoto Morijiri, all of Hitachi; Shinji Narishige; Masanobu Hanazono, both of Mito; Toshihiro Yoshida, Fujisawa, all of Japan

[73] Assignee: Hitachi, Ltd., Tokyo, Japan

[21] Appl. No.: 779,469

[22] Filed: Sep. 24, 1985

[30] Foreign Application Priority Data

Sep. 25, 1984 [JP] Japan .................. 59-199870

[51] Int. Cl.⁴ .......................................... G11B 5/147
[52] U.S. Cl. ..................... 360/126; 360/125
[58] Field of Search ............... 360/126, 125, 123, 127, 360/113, 122; 148/313; 420/435

[56] References Cited

U.S. PATENT DOCUMENTS

| | | | |
|---|---|---|---|
| 3,617,260 | 11/1971 | Detert | 148/313 X |
| 4,150,981 | 4/1979 | O'Handley | 420/435 X |
| 4,242,710 | 12/1980 | Hempstead et al. | 360/126 X |
| 4,484,957 | 11/1984 | Higuchi et al. | 420/435 X |
| 4,564,399 | 1/1986 | Tateishi et al. | 420/435 X |
| 4,623,439 | 11/1986 | Mitsuoka et al. | 204/192.2 |
| 4,626,947 | 12/1986 | Narishige et al. | 360/126 |

OTHER PUBLICATIONS

IBM Technical Disclosure Bulletin, vol. 18, No. 1, Jun. 1975, Hybrid Process for Thin-Film Heads, Smith.
IEEE Transactions on Magnetics, vol. 19, No. 2, Mar. 1983, NiFeCo—An Alternative to Permalloy for Bubble Domain Detection, Sanders.
Ferromagnetism, Bozorth.

Primary Examiner—Robert S. Tupper
Assistant Examiner—Andrew L. Sniezek
Attorney, Agent, or Firm—Antonelli, Terry & Wands

[57] ABSTRACT

A thin film magnetic head comprising a lower magnetic film, an upper magnetic film which is formed over the lower magnetic film and in which one end is come into contact with one end of the lower magnetic film and the other end faces the other end of the lower magnetic film through a magnetic gap and thereby forming a magnetic circuit which has a magnetic gap in a part thereof, together with the lower magnetic film, and a conductor coil forming a coil of a predetermined number of turns and passing between the upper and lower magnetic films and crossing the magnetic circuit. Each of the upper and lower magnetic films is formed of a Co-Ni-Fe ternary alloy having a face-centered cubic crystal structure. Also, uniaxial anisotropy is alternately and perpendicularly given in every layer of a predetermined thickness stacked in the direction of thickness of the film.

12 Claims, 4 Drawing Sheets

THIN FILM MAGNETIC HEAD HAVING MAGNETIC FILM OF CO-NI-FE ALLOY

BACKGROUND OF THE INVENTION

1. Field of the Invention

The present invention relates to a thin film magnetic head and, more particularly, to a thin film magnetic head suitable for use in a magnetic disk apparatus.

Particularly, the present invention has a feature in a magnetic core.

2. Description of the Prior Art

Hitherto, Permalloy, which is a binary alloy of nickel of about 80 weight % and iron of about 20 weight %, has been used as a magnetic core material for thin film magnetic heads. This material has an almost null magneto-striction coefficient and a high magnetic permeability in the high frequency region. Therefore, the thin film magnetic head using this magnetic core material has excellent readout performance.

However, the saturation magnetic flux density of Permalloy is low, i.e. about one tesla. Thus, the writing performance of the thin film magnetic head using the magnetic core of Permalloy is not high. Practically speaking, in magnetic disk apparatuses, there is a tendency that a material having a high coercive force is used as a material of the recording medium from the viewpoint of realization of a high recording density. The thin film magnetic head having a magnetic core of Permalloy has degraded writing performance to the recording medium of a high coercive force.

SUMMARY OF THE INVENTION

It is an object of the present invention to provide a thin film magnetic head provided with a magnetic core having a high permeability, an almost null magneto-striction coefficient and a higher saturation magnetic flux density than Permalloy and, therefore, is excellent in both readout performance and writing performance.

The present invention relates to a thin film magnetic head comprising: a lower magnetic film; an upper magnetic film, formed over the lower magnetic film in which one end of the upper magnetic film comes into contact with one end of the lower magnetic film and the other end faces the other end of the lower magnetic film through a magnetic gap, thereby forming a magnetic circuit, a part of which has a magnetic gap together with the lower magnetic film; and a conductor coil forming a coil of predetermined turns which passes between the upper and lower magnetic films and crosses the magnetic circuit. This thin film magnetic head is characterized in that each of the upper and lower magnetic films contains at least 97 weight % of a cobalt alloy comprising cobalt (Co) of 62-95 weight %, nickel (Ni) of 3-30 weight %, and iron (Fe) of 2-8 weight % and has a face-centered cubic crystal structure. Further, uniaxial anisotropy is alternately perpendicularly given for every layer of a predetermined thickness stacked in the direction of thickness of the film, e.g. in a manner as x-y-x-y . . . .

As physical properties of a core material for the thin film magnetic head which can realize a high recording density in magnetic recording, there are needed magnetic properties comparable to those of the thin Permalloy films; i.e. an anisotropic magnetic field of 2 to 5 oersteds, an extremely small magneto-striction coefficient, namely, $+2\times10^{-6}$ to $-2\times10^{-6}$ and a low coercive force below one oersted; and a high saturation magnetic flux density as compared with one tesla of the thin Permalloy film, namely at least 1.3 teslas.

The present inventors have paid attention to the fact that a Co-Ni-Fe ternary alloy bulk material has a high saturation magnetic flux density and almost zero magneto-striction coefficient and studied the film structure and film composition range which are suitable to make the anisotropic magnetic field as small as that of the thin Permalloy film.

Regarding the Co-Ni-Fe alloy, Bozorth, "Ferromagnetism," published by Van Nostrand, Vol. 4, page 165, which is incorporated by reference herein, sets forth the fact that the saturation magnetic flux density becomes larger than that of Permalloy within the composition range where the magneto-striction coefficient becomes near zero, namely, the composition range of 0-80 weight % Ni, 0-90 weight % Co, and 0-20 weight % Fe.

There has also been reported in IEEE Transactions on Magnetics, Vol. MAG-19, (1983), pages 131-135, which is incorporated by reference herein, the fact that the magnetic permeability can be raised by performing a thermal treatment in a rotating magnetic field after producing a Co base alloy film.

However, although these articles suggest amorphous Co base alloy films, nothing is disclosed with respect to the thermal treatment effect in the rotating magnetic field with regard to the crystalline alloy film.

The upper and lower magnetic films in the magnetic head of the present invention are manufactured by depositing Co-Ni-Fe ternary alloys on a substrate while alternately applying the magnetic field at a predetermined frequency in paralel with the substrate surface in the directions which cross perpendicularly with each other, namely, by forming the magnetic films in the orthogonal switching magnetic field.

On one hand, if the method of manufacturing the magnetic films in the orthogonal switching magnetic field is applied to Permalloy evaporated films, this will increase the anisotropic dispersion and may cause the coersive force to be increased. Thus, this method is undesirable as a method for manufacturing the magnetic core for a thin film magnetic head. In other words, applying the orthogonal switching magnetic field to the thin Permalloy film results in an undesirable effect.

A reason why the composition range of the Co-Ni-Fe ternary alloy thin film is limited is because if the content of Co is less than 62 weight %, the saturation magnetic flux density becomes below 1.3 teslas, so that the performance as a high saturation magnetic flux density cannot be achieved; on the contrary, if the content of Co is larger than 95 weight %, the coercive force becomes large, so that realization of a high permeability cannot be expected. It is preferable to select the comosition of Co at least 72 weight %.

Ni is concerned with the saturation magnetic flux density together with Co and if its content is over 30 weight %, the flux density becomes below 1.3 teslas, while if it is less than 3 weight %, the magneto-striction coefficient is shifted to the positive side and becomes higher than $+2.0\times10^{-6}$. It is particularly preferable to select the Ni composition at least 12 weight % and at most 22 weight %.

Fe most strongly influences on the magnetostriction coefficient and if the content of Fe is less than 2 weight % under the condition whereby a high saturation magnetic flux density is secured while the contents of Co and Ni are set within the above-mentioned proper ranges, the magneto-striction coefficient is largely shifted to the negative side and becomes lower than $-2\times10^{-6}$. On the contrary, if the content of Fe is larger than 8 weight %, the magneto-striction coefficient is largely shifted to the positive side and becomes higher than $+2\times10^{-6}$.

For the foregoing reasons, the compositions of the Co-Ni-Fe alloy are selected such that Co is 62-95 weight %, Ni is 3-30 weight %, and Fe is 2-8 weight %.

The preferable compositions of the Co-Ni-Fe alloy are such that Ni is 12-22 weight %, Fe is 2-8 weight %, and the residual composition consists of Co of at least 72 weight %.

The upper and lower magnetic films in the thin film magnetic head of the present invention may contain a small quantity of the fourth component in addition to Co, Ni and Fe. As the fourth component, at least one element selected from boron (B), indium (In), antimony (Sb), and bismuth (Bi) is suitably used. The total amount of the fourth component should not exceed 3 weight %. In the case where the fourth component is contained, the total effective quantity is at least 0.05 weight %. Therefore, when the fourth component is positively contained, its content should be within a range of 0.05 to 3 weight % in total.

Addition of B to the Co-Ni-Fe alloy makes it possible to further reduce the coercive force and to improve the readout performance of the thin film magnetic head. It is preferable to select the content of B at 0.05-0.5 weight %. If the content of B is less than 0.05 weight %, the reducing effect of the coercive force becomes small. Contrarily, if it is larger than 0.5 weight %, the film quality is degraded.

At least one of In, Sb and Bi as the fourth component has the effect of raising the heat-resisting property of the Co-Ni-Fe alloy thin film. It is essential that the fourth component is selected from those which do not form solid solution with the Co-Ni-Fe alloy base but are precipitated at the crystal grain boundaries. Solid-solution of the fourth component in the Co-Ni-Fe alloy base may cause large variations in magneto-striction coefficient, saturation magnetic flux density, coercive force, etc., so that it is undesirable.

It is preferable to form the Co-Ni-Fe ternary alloy thin film according to the present invention by depositing it on a substrate by way of plating.

The most suitable method by way of plating is realized in the following manner. Electroplating is performed with a plating current density of 6-30 mA/cm$^2$ using the plating solution having a pH of 2.5 to 3.5 and held at temperatures of 20° to 35° C. in which the Co$^{++}$ ion concentration is 3-20 g/l, the Ni$^{++}$ ion concentration is 10-30 g/l and the Fe$^+$ ion concentration is 0.2-1.0 g/l. The plating is performed while alternately (sequentially) applying crossed external magnetic fields at a predetermined frequency parallel to the plating surface in the directions which are perpendicular to each other during the plating process.

To test the present invention, depositing by plating was mainly adopted. Hydrated cobalt sulfate of the concentration of 20-70 g/l was used as a Co source. Hydrated nickel chloride or hydrated nickel sulfate and a solution in which they coexist were used as a Ni source which has the concentration of 10-90 g/l. Hydrated ferrous sulfate of the concentration of 1-5 g/l was used as a Fe source. In addition to those components, a proper quantity of boric acid was added as a pH buffer agent during plating. A proper quantity of saccharin sodium was added as a stress relaxation agent of the plated film. A proper quantity of lauryl sodium sulfate was added as a surface active agent.

The temperature of the plating solution was set to 25°-35° C. The plating current density was changed in the range of 10-30 mA/cm$^2$. The value of pH was set to 2.5-3.5.

The orthogonal switching magnetic fields of 30 to 60 Oe were respectively applied by Helmholtz coils at a repetitive frequency of 1 to 10 Hz to the thin film of the Co-Ni-Fe ternary system during the plating, in which pairs of Helmholtz coils, each pair sandwiching the substrate, were disposed in parallel with the substrate and perpendicularly with each other.

Good Co-Ni-Fe ternary alloy thin films were obtained by plating under the conditions of the above ranges, which presented a uniaxial anisotropy and had an anisotropic magnetic field below 10 Oe.

Meanwhile, it is possible to obtain films having a uniaxial anisotropy by applying other kinds of external magnetic fields or a unidirectional external magnetic field, but they are not preferable since the anisotropic magnetic field becomes too large, e.g. over 20 Oe. It is possible to obtain magnetic thin films exhibiting uniaxial anisotropy and small anisotropic magnetic field by repeatedly applying external magnetic fields at a predetermined frequency onto the substrate for deposition of the plated film in orthogonal directions. Further, proper selections of the repetitive frequency and the ratio of the periods of time during which the respective orthogonal magnetic fields of X-Y directions are applied makes it possible to reduce the anisotropic magnetic field of the magnetic film to 10 Oe or below.

DESCRIPTION OF THE PREFERRED EMBODIMENTS

Example 1

An ordinary glass substrate having a diameter of 3 inches and a thickness of 0.5 mm was used as a substrate. First, after the substrate was sufficiently cleaned by boiling ultrasonic cleaning in trichloroethylene, Permalloy is deposited by sputtering or vacuum deposition to a thickness of 0.1 μm to form the underlayer substrate for plating.

The substrate with the underlayer film was attached to a jig in the plating bath and the bath was filled with a Co-Ni-Fe electroplating solution of the following compositions, then it was circulated and stirred.

$CoSO_4 \cdot 7H_2O$:45 g/l
$NiCl_2 \cdot 6H_2O$:60 g/l
$NiSO_4 \cdot 6H_2O$:25 g/l
$FeSO_4 \cdot 7H_2O$:2.0 g/l
Boric acid:25 g/l
Saccharin sodium:1.5 g/l
Lauryl sodium sulfate:0.15 g/l The plating current controlled to 17 mA/cm$^2$ was allowed to flow between the anode (Ni) and the cathode (substrate). The temperature of the bath was set to 30° C. and pH was controlled to 3.0. During the plating, orthogonal switching magnetic fields were applied at a repetitive frequency of 5 Hz, the applied magnetic fields in the X direction (direction of an axis of easy magnetization) and the Y direction (direction of an axis of difficult magnetization) were 30 Oe, and the ratio of the repetitive pulse widths in the X and Y directions is 6:4.

For the purpose of comparison, the film plated in the conventionally employed unidirectional magnetic field instead of the orthogonal switching magnetic field was estimated as well. The film thickness was 1.5 μm.

Figure 1:
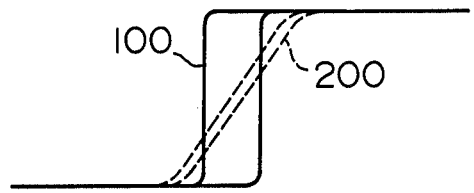
FIG. 1 is a diagram showing an example of a B-H curve of a Co-Ni-Fe ternary alloy film according to the present invention.
Figure 2:
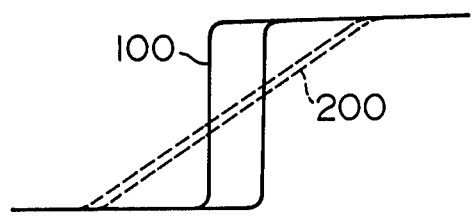
FIG. 2 is a diagram showing a B-H curve of an alloy film according to a conventional method.

FIGS. 1 and 2 show B-H curves of the magnetic thin films obtained in the above manner according to the present invention and to the conventional method. In FIGS. 1 and 2, reference numeral 100 denotes the B-H curve in the direction of an axis of easy magnetization, and 200 indicates the B-H curve in the direction of an axis of difficult magnetization. Other magnetic characteristics and film compositions of the present example according to the present invention are as shown in Table 1.

TABLE 1

| Film compositions (weight %) | 78% Co—16% Ni—6% Fe |
|---|---|
| Saturation magnetic flux density | 1.53 teslas |
| Coercive force in the direction of an axis of difficult magnetization | 1 oersted |
| Anisotropic magnetic field | 6 oersteds |
| Magneto-striction coefficient | $0.8 \times 10^{-6}$ |

As is obvious from the above-mentioned results, the magnetic thin film according to the present invention exhibits uniaxial anisotropy with a small anisotropic magnetic field, and very high saturation magnetic flux density of 1.5 teslas, which value is 1.5 times as high as that of a conventional binary Permalloy. It has been found that the magnetic thin film of the comparison example showed a similar saturation magnetic flux density of 1.5 teslas, but a larger anitostropic magnetic field of about 20 Oe, which value was about three times as large as that of the magnetic thin film according to the invention.

Example 2

A substrate shown in Example 1 was attached to the same plating bath and was immersed in a Co-Ni-Fe electroplating solution containing:

$CoSO_4 \cdot 7H_2O$:35 g/l
$NiCl_2 \cdot 6H_2O$:85 g/l
$FeSO_4 \cdot 6H_2O$:2.0 g/l
Boric acid:25 g/l
Saccharin sodium:1.5 g/l
Lauryl sodium sulfate:0.1 g/l Electroplating was performed while circulating and stirring the electroplating solution. A plating current controlled to 10 mA/cm$^2$ was allowed to flow between the anode (Ni) and the cathode (substrate). The temperature of the bath was set to 30° C. and pH was controlled to 3.0. During the plating, orthogonal switching magnetic fields were alternately applied at a repetitive frequency of 1 Hz. Each of the applied magnetic fields in the X and Y directions was 45 Oe, and the ratio of the repetitive pulse widths in the X and Y fields was 5:5. The film thickness was 2.5 μm. The B-H curve of the magnetic film according to the present example obtained in this manner had almost the same shape as in FIG. 1 and the anisotropic magnetic field was 9 Oe and the coercive force in the direction of an axis of difficult magtnization was 0.9 Oe. Other magnetic characteristics and film compositions are as shown in Table 2.

TABLE 2

| Film compositions (weight %) | 74% Co—20% Ni—6% Fe |
|---|---|
| Saturation magnetic flux density | 1.50 teslas |
| Coercive force in the direction of an axis of difficult magnetization | 0.9 oersted |
| Anisotropic magnetic field | 9 oersteds |
| Magneto-striction coefficient | $2 \times 10^{-6}$ |

Example 3

A similar substrate as that described in Example 1 was attached to a jig in the plating bath and put in the Co-Ni-Fe electroplating solution containing:

$CoSO_4 \cdot 7H_2O$:55 g/l
$NiCl_2 \cdot 6H_2O$:60 g/l
$NiSO_4 \cdot 6H_2O$:25 g/l
$FeSO_4 \cdot 7H_2O$:2.5 g/l
Boric acid:25 g/l
Saccharin sodium:1.5 g/l
Lauryl sodium sulfate:0.1 g/l The electroplating was performed while circulating and stirring the electroplating solution. A plating current controlled to 15 mA/cm$^2$ was allowed to flow between the anode (Ni) and the cathode (substrate). The temperature of the bath was set to 30° C. and pH was controlled to 3.0. During the plating, orthogonal switching magnetic fields were alternately applied at a repetitive frequency of 3 Hz. Each of the applied magnetic fields in the X and Y directions was 40 Oe, and the ratio of the pulse widths in the X and Y fields was 6:4. The film thickness was 1.5 μm.

The B-H curve of the magnetic film according to the present example obtained in this way had almost the same shape as in FIG. 1 and the anisotropic magnetic field was 6 Oe and the coercive force in the direction of an axis of difficult magnetization was 1 Oe. Magnetic characteristics are listed in Table 3.

TABLE 3

| Film compositions (weight %) | 82% Co—12% Ni—6% Fe |
|---|---|
| Saturation magnetic flux density | 1.60 teslas |
| Coercive force in the direction of an axis of difficult magnetization | 1.0 oersted |
| Anisotropic magnetic field | 6.0 oersteds |
| Magneto-striction coefficient | $-0.6 \times 10^{-6}$ |

As is obvious from the above results, the magnetic thin film according to the present example exhibited a uniaxial anisotropy with a small anisotropic magnetic field and a high saturation magnetic flux density over 1.5 teslas, so that realization of a high permeability can be expected. On the other hand, a magnetic film plated in the unidirectional magnetic field had a large anisotropic magnetic field about three or more times as large as that of the inventive film, so that the permeability was low and the readout voltage was insufficient when used in the thin film magnetic head or the like.

Example 4

Figure 3:
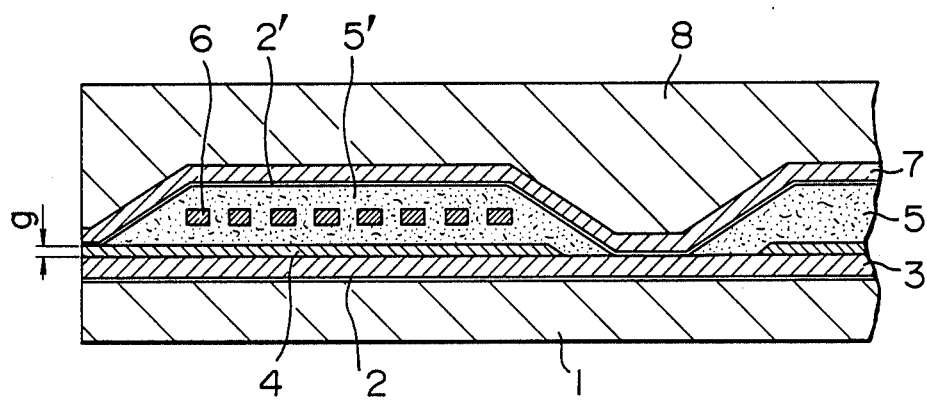
FIG. 3 is a partial cross sectional view of a thin film magnetic head manufactured by applying the Co-Ni-Fe ternary alloy thin film according to the present invention.
Figure 4:
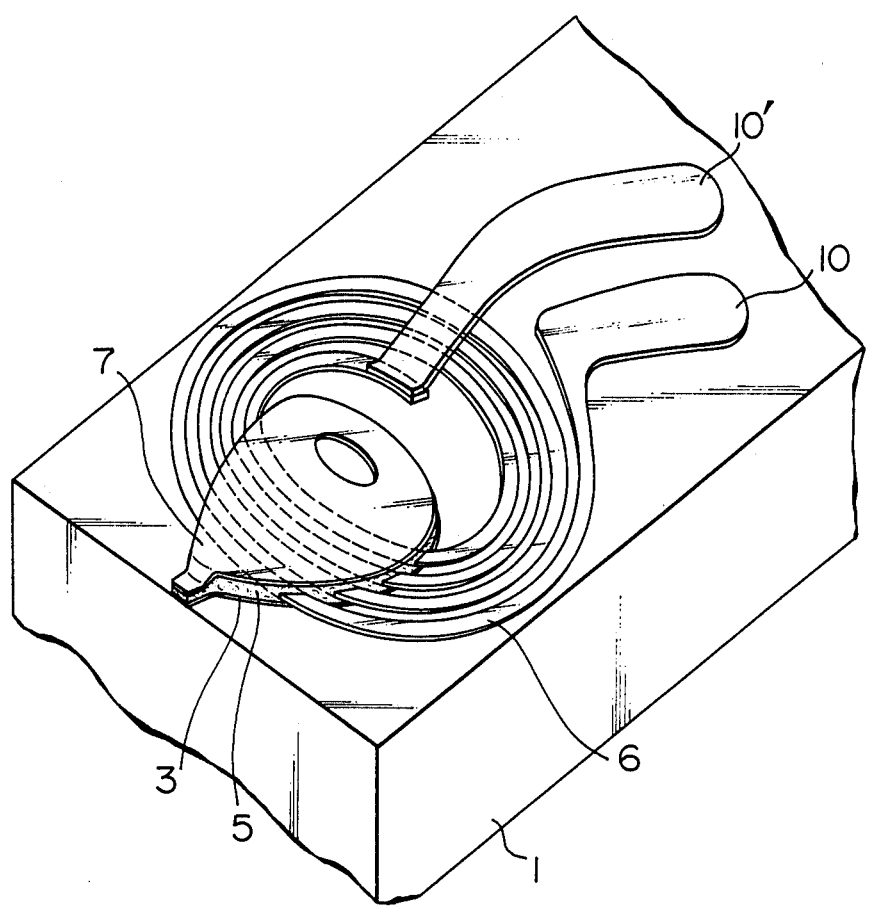
FIG. 4 is a perspective view of a thin film magnetic head.

A Permalloy thin film 2 (about 0.1 μm) (see FIG. 3) is formed by sputtering as an underlayer film to perform plating on a ceramic substrate 1 whose surface is sufficiently polished and cleaned. The Permalloy thin film 2 is connected as a cathode in the plating solution containing $CoSO_4 \cdot 7H_2O$ of 70 g/l, $NiCl_2 \cdot 6H_2O$ of 88 g/l and $FeSO_4 \cdot 7H_2O$ of 2.65 g/l as main components. The value of pH is controlled at 3.0 and the temperature of the bath is maintained at 30° C. A lower magnetic film 3 is plated on the whole surface of the substrate in the bath using Ni as an anode with a current density of 17 mA/cm² so as to have a thickness of 1.5 μm. The lower magnetic film 3 exhibits a high saturation magnetic flux density and contains Co of 82.2 weight %, Ni of 13.4 weight % and Fe of 4.4 weight %. Next, the plated film together with the underlayer film is patterned to have a predetermined magnetic core shape by ion milling, wet etching or the like. Then, a gap material 4 such as $Al_2O_3$ or the like, an organic insulation layer 5, a conductor coil 6, and a further organic insulation 5' are sequentially deposited by the film technology, and they are finished to have a predetermined shape by ion milling or wet etching. An underlayer film 2' is formed on the organic insulation 5' by sputtering similarly to the lower magnetic film 3. An upper magnetic film 7 consisting of a material (82.2 weight % Co—13.4 weight % Ni—4.4 weight % Fe) of a high saturation magnetic flux density and having a thickness of about 2 μm is plated on the underlayer film 2' in the same plating solution under the same conditions. The upper magnetic film 7 is likewise patterned to have the magnetic core shape by ion milling, wet etching, or the like. Thereafter, an insulation film such as $Al_2O_3$ or the like is formed on the whole surface of the substrate by sputtering, thereby forming a protection film 8. Then, a block is cut out from the substrate 1 and the side of the magnetic head is ground to have a predetermined dimension to form a magnetic gap g, thereby forming a thin film magnetic head. FIG. 3 shows a cross sectional view of a part of the magnetic head obtained in this manner. FIG. 4 shows a perspective view of the thin film magnetic head cut out.

In plating the lower and upper magnetic films, orthogonal switching magnetic fields were applied during the plating under the conditions that the repetitive frequency is 10 Hz and that the ratio of the periods of time during which the respective magnetization currents are allowed to flow through the orthogonal coils (this ratio is called a pulse width ratio) is 5.5:4.5. Magnetic characteristics of the plated film formed on a dummy substrate under the same conditions were excellent: the saturation magnetic flux density was 1.5 teslas, the anisotropic magnetic field was 5 oersteds, and the magneto-striction coefficient was $-0.5 \times 10^{-6}$. It has been found that the anisotropic magnetic field according to the present invention was 5 oersteds, which value was reduced to about 1/6 as compared with the value of about 30 oersteds which has generally been reported. This is because the induced magnetic anisotropy of the film to be plated is alternately, sequentially and perpendicularly given by the orthogonal switching magnetic fields in every unit thickness in the direction of thickness which is determined by the film forming speed, repetitive frequency, and pulse width ratio. In the whole film, the anisotropic magnetic field appears as a mean and hence is reduced as compared with the film plated while applying a magnetic field in only one fixed direction.

In the above examples, the lower and upper magnetic films were plated on the whole surface of the substrate and then patterned to have a core shape by ion milling. However, frame plating can also be performed using a resist frame which is formed to have a core shape.

When comparing the electric characteristics of the thin film head produced in this manner with those of the head using a conventional thin Permalloy film, been confirmed that the writing and readout were improved by about 30%. In particular, as distance, i.e. the spacing between the magnetic head the recording medium, increases, the difference in performance becomes more apparent. This means that the saturation magnetic flux density of the magnetic thin film according to the invention was increased by about 50% as compared with that of the thin Permalloy film. The magnetic thin film of the invention can sufficiently cope with the medium of a high coercive force for a high recording density. In addition, it has been found that the influence on the waveform distortion could be reduced by an amount commensurate with an increase in output.

Explanation will then be made on the proper composition ranges of the foregoing thin film material of a high saturation magnetic flux density and on the process of reduction in the anisotropic magnetic field by the plating in orthogonal switching magnetic fields.

Figure 5:
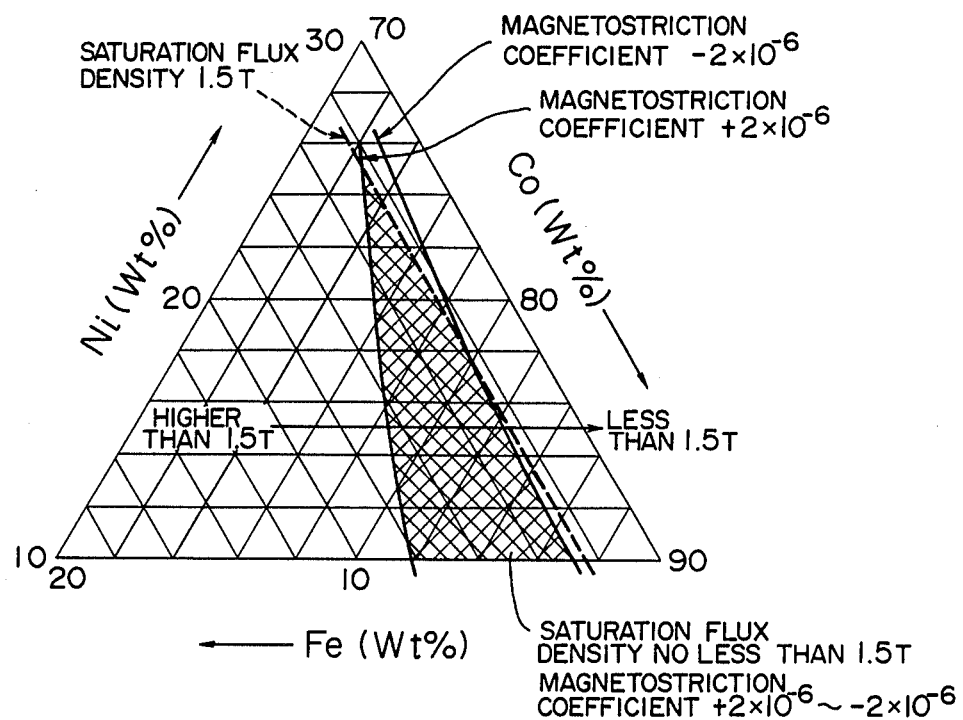
FIG. 5 is a diagram showing a proper composition range of the Co-Ni-Fe ternary alloy thin film found in the course of research for the present invention.

As main compositions of the plating solution, $CoSO_4 \cdot 7H_2O$, $NiSO_4 \cdot 6H_2O$ ($NiCl_2 \cdot 6H_2$) may be mixed), and $FeSO_4 \cdot 7H_2O$ were used and their contents were changed within the ranges of 14-150 g/l, 40-200 g/l and 1-5 g/l, respectively. The pH was set to 3.0. The temperature of the bath was changed within the range of 20°-35° C. and the plating was performed within the range of the current density of 6-30 mA/cm². The relationships among the compositions of the film, the saturation magnetic flux density, and the magneto-striction coefficient wer examined. In this way, proper composition ranges for producing preferred performances of the thin film magnetic head, i.e. a high saturation magnetic flux density and an almost zero magneto-striction coefficient, were found to be as shown in FIG. 5; over 72 weight % Co, below 22 weight % Ni, and 2-8 weight % Fe. However, if the content of Co is larger than 95 weight %, a hexagonal close-packed structure is formed, so that the coercive force becomes high and the magnetic characteristics become unstable. Therefore, the Co content is preferably not higher than 95 weight %. In this experiment, the plating was carried out in the ordinary unidirectional magnetic field, and the anisotropic magnetic field of the film exhibited high values of about 20 oersteds.

Then, orthogonal switching magnetic fields were applied during plating materials within the proper composition ranges to reduce the anisotropic magnetic field, and the characteristics of the plated films were examined.

The compositions of the solution and the plating conditions are as follows.

COMPOSITIONS OF THE SOLUTION $CoSO_4 \cdot 7H_2O$:66.7 g/l
$NiSO_4 \cdot 6H_2O$:24.9 g/l
$NiCl_2 \cdot 6H_2O$:59.5 g/l
$FeSO_4 \cdot 7H_2O$:2.65 g/l
Dimethylamine-borane:0.1 g/l
Boric acid:25 g/l
Saccharin sodium:1.5 g/l
Lauryl sodium sulfate:0.1 g/l

PLATING CONDITIONS pH:3.0
Temperature of the bath:30° C.
Current density:17 $mA/cm^2$

ORTHOGONAL FIELD SWITCHING CONDITION

Intensity of the magnetic field:50 oersteds
Repetitive frequency:10 Hz
Pulse width ratio:6:4

Figure 6:
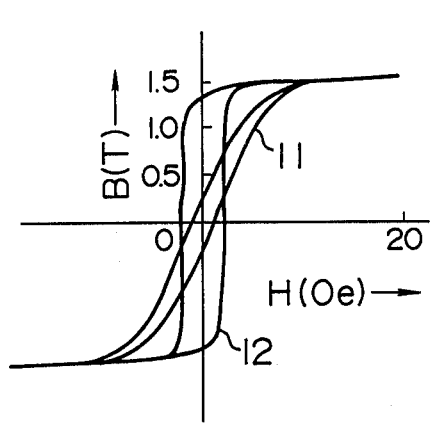
FIG. 6 is a diagram showing an example of a B-H curve of a film plated in the orthogonal switching magnetic fields in the present invention.
Figure 7:
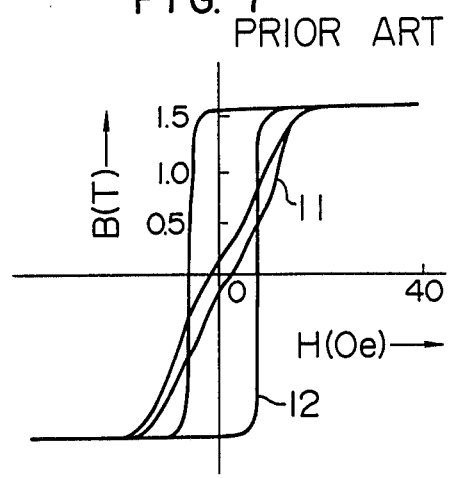
FIG. 7 is a diagram showing an example of a B-H curve of a film plated in the ordinary unidirectional magnetic field.

The thickness of the plated film obtained was 2.0 μm and the compositions were 82.2 weight % Co—13.0 weight % Ni—4.6 weight % Fe—0.2 weight % B. The magnetic characteristics were excellent in that the saturation magnetic flux density was 1.56 teslas and the magneto-striction coefficient was $1.4 \times 10^{-6}$. The uniaxial anisotropy was presented and the anisotropic magnetic field was low, i.e. 7 oersteds. FIG. 6 shows the B-H curve of the film formed in this way. FIG. 7 shows the B-H curve of the film plated in the ordinary unidirectional magnetic field. It has been found that the anisotropic magnetic field was reduced to about ⅓ as compared with that of the film plated in the ordinary unidirectional magnetic field.

Next, the characteristics of the film plated within the same solution compositions and under the same plating condition while the orthogonal field switching condition was changed as described below were such that the film thickness was the same, 2 μm, and the film compositions were also the same.

ORTHOGONAL FIELD SWITCHING CONDITIONS

Intensity of the magnetic field:50 oersteds
Repetitive frequency:10 Hz
Pulse width ratio:5.5:4.5

Regarding the magnetic characteristics, the saturation magnetic flux density and magneto-striction coefficient exhibited the same values as those in the foregoing case since the compositions are the same. However, it has been found that the anisotropic magnetic field was fairly reduced to 5 oersteds. In addition, it has been found that dimethylamine-borane had the effect of reduction in coercive force.

Figure 8:
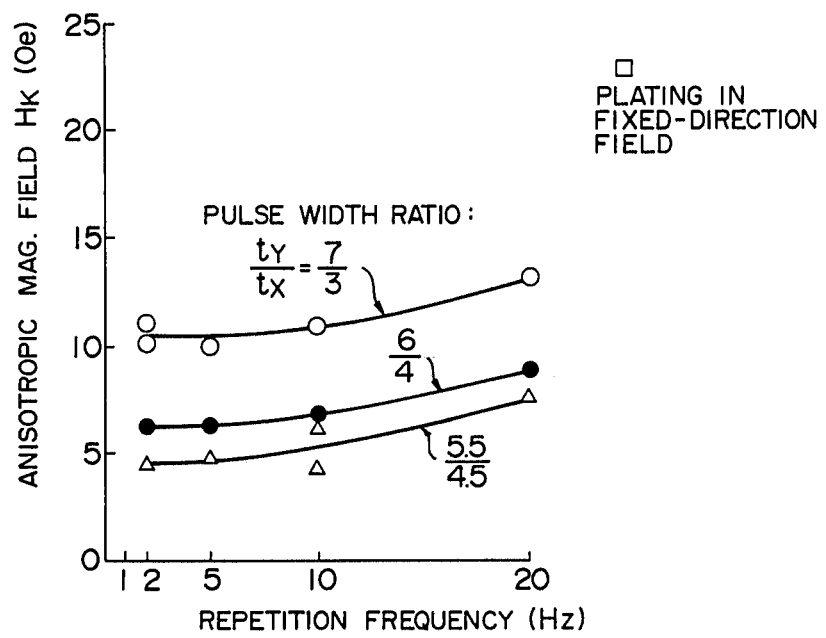
FIG. 8 is a diagram showing a proper composition range of the Co-Ni-Fe ternary alloy thin film according to the present invention.

In addition to those results, the anisotropic magnetic fields of the films plated under various kinds of orthogonal field switching conditions ar shown in FIG. 8.

As mentioned above, magnetic thin films according to the present invention can exhibit almost comparable performances in the magnetic characteristics required for a thin film magnetic head to those of a conventional thin Permalloy film, while they have high saturation magnetic flux density of no less than 1.5 teslas, which was increased by more than about 50% as compared with that of the thin Permalloy film.

In applying orthogonal switching magnetic fields, even if the applying direction is deviated by about ±10° from the orthogonal (90 degrees) relation, the performance of the film is equally good.

As described above, in the thin film magnetic head of the present invention, the upper and lower magnetic film essentially consist of the Co-Ni-Fe ternary alloy thin films and these thin films have the saturation magnetic flux densities higher than that of Permalloy and are equivalent to Permalloy in the magneto-striction coefficient and permeability.

Consequently, according to the present invention, the writing performance is more excellent than that of the thin film magnetic head having upper and lower magnetic films formed of thin Permalloy films.

We claim:

1. A thin film magnetic head comprising:
   a lower magnetic film;
   an upper magnetic film which is formed over said lower magnetic film and in which one end is in contact with one end of said lower magnetic film and the other end faces the other end of the lower magnetic film through a magnetic gap, thereby forming a magnetic circuit and
   a conductor coil forming a coil of a predetermined number of turns and passing between said upper and lower magnetic films,
   wherein each of said upper and lower magnetic films is formed of a material containing at least 97 weight % of cobalt alloy essentially consisting of cobalt of 62-95 weight %, nickel of 3-30 weight %, and iron of 2-8 weight % and having a face-centered cubic crystal structure, and each of said upper and lower magnetic films has uniaxial anisotropy that alternates in substantially perpendicular directions throughout the thickness of each of said upper and lower magnetic films, said uniaxial anisotropy being induced into each of said upper and lower magnetic films by periodically applying a magnetic field parallel to a substrate surface over which each of said upper and lower films is formed.

2. A thin film magnetic head according to claim 1, wherein a magneto-striction coefficient of each of said upper and lower magnetic films lies within a range of $+2 \times 10^{-6}$ to $-2 \times 10^{-6}$, an anisotropic magnetic field is below 10 oersteds and a saturation magnetic flux density is over 1.3 teslas.

3. A thin film magnetic head according to claim 1, wherein the composition ratio of said cobalt alloy is essentially 12-22 weight % Ni, 2-8 weight % Fe, and the residual composition of Co of at least 72 weight %.

4. A thin film magnetic head according to claim 1, wherein said material further includes 0.05-3 weight % of at least one element selected from the group consisting of In, Sb, and Bi.

5. A thin film magnetic head according to claim 1, wherein each of said upper and lower magnetic films is obtained by applying magnetic fields in parallel to a substrate surface over which each of said upper and lower magnetic films is formed, said magnetic fields being alternately and sequentially applied in a first direction and a second direction substantially orthogonal to said first direction while depositing each of said upper and lower magnetic films.

6. A thin film magnetic head according to claim 1, wherein each of said upper and lower magnetic films is formed by plating.

7. A thin film magnetic head according to claim 1, wherein said material further includes B of 0.05-0.5 weight %.

8. A thin film magnetic head according to claim 1, wherein at least one of said upper magnetic film and said lower magnetic film includes Co of 62-95 weight %, Ni of 3-30 weight %, and Fe of 2-8 weight %.

9. A thin film magnetic head according to claim 1, wherein at least one of said upper magnetic film and said lower magnetic film includes Ni of 12-22 weight %, Fe of 2-8 weight %, and the residual composition including at least 72 weight % Co.

10. A thin film magnetic head according to claim 1, wherein at least one of said upper magnetic film and said lower magnetic film includes Ni of 12-22 weight %, Fe of 2-8 weight %, B of 0.05-0.5 weight %, and the residual composition of Co of at least 72 weight %.

11. A thin film magnetic head according to claim 1, wherein each of said upper and lower magnetic films exhibits an anisotropic magnetic field less than or equal to 10 oersteds.

12. A thin film magnetic head according to claim 11, wherein each of said upper and lower magnetic films has uniaxial anisotropy parallel to a major surface of each of said upper and lower magnetic films.

* * * * *